United States Patent
Cho

(10) Patent No.: US 11,570,355 B2
(45) Date of Patent: Jan. 31, 2023

(54) METHOD, SYSTEM, AND COMPUTER-READABLE MEDIUM FOR IMAGE SENSOR COMMUNICATION USING DIFFERENT SENDING DATA SEQUENCE RATE AND RECEIVING FRAME RATE

(71) Applicant: GUANGDONG OPPO MOBILE TELECOMMUNICATIONS CORP., LTD., Guangdong (CN)

(72) Inventor: Hirotake Cho, Kanagawa (JP)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/326,059

(22) Filed: May 20, 2021

(65) Prior Publication Data
US 2021/0274090 A1    Sep. 2, 2021

Related U.S. Application Data

(63) Continuation of application No. PCT/CN2018/117445, filed on Nov. 26, 2018.

(51) Int. Cl.
*H04N 5/232* (2006.01)
*H04N 5/235* (2006.01)
(Continued)

(52) U.S. Cl.
CPC ....... *H04N 5/23222* (2013.01); *H04N 5/2353* (2013.01); *H04N 9/07* (2013.01); *H04N 9/64* (2013.01)

(58) Field of Classification Search
CPC ............ H04N 5/23222; H04N 5/2353; H04N 5/3765; H04N 9/804
See application file for complete search history.

(56) References Cited

U.S. PATENT DOCUMENTS

| 9,622,326 B1 | 4/2017 | Devyver et al. |
| 2011/0221929 A1 | 9/2011 | Miyahara et al. |

(Continued)

FOREIGN PATENT DOCUMENTS

| CN | 105391948 A | 3/2016 |
| JP | 4303087 B2 | 7/2009 |

(Continued)

OTHER PUBLICATIONS

Extended European Search Report for EP Application 18941181.2 dated Nov. 12, 2021. (9 pages).

(Continued)

*Primary Examiner* — Ahmed A Berhan
(74) *Attorney, Agent, or Firm* — Young Basile Hanlon & MacFarlane, P.C.

(57) ABSTRACT

In an embodiment, a computer-implemented method includes: causing a camera module to capture a plurality of frame portions with an exposure time at a sampling clock period. The frame portions correspondingly reflect a predetermined number of first signal pulses periodically generated by a light source. The exposure time corresponds to a duration of one of the predetermined number of first signal pulses. A first data sequence is encoded into the first signal pulses. The sampling clock period is different from a duration of the first data sequence such that a second data sequence is obtained from cycling through all of the first data sequence.

18 Claims, 9 Drawing Sheets

(51) Int. Cl.
　　　*H04N 9/07*　　　(2006.01)
　　　*H04N 9/64*　　　(2006.01)

(56) References Cited

U.S. PATENT DOCUMENTS

| | | | |
|---|---|---|---|
| 2014/0002718 A1 | 1/2014 | Spielberg | |
| 2016/0316124 A1 | 10/2016 | Bessettes et al. | |
| 2017/0187455 A1 | 6/2017 | Roberts et al. | |
| 2020/0287624 A1* | 9/2020 | Darbi | H04J 14/02 |

FOREIGN PATENT DOCUMENTS

| | | |
|---|---|---|
| JP | 5294096 B2 | 9/2013 |
| JP | 5393917 B1 | 1/2014 |
| WO | 2014144986 A1 | 9/2014 |
| WO | 2016128967 A1 | 8/2016 |

OTHER PUBLICATIONS

International Search Report for PCT application PCTCN2018117445 dated Aug. 27, 2019.

* cited by examiner

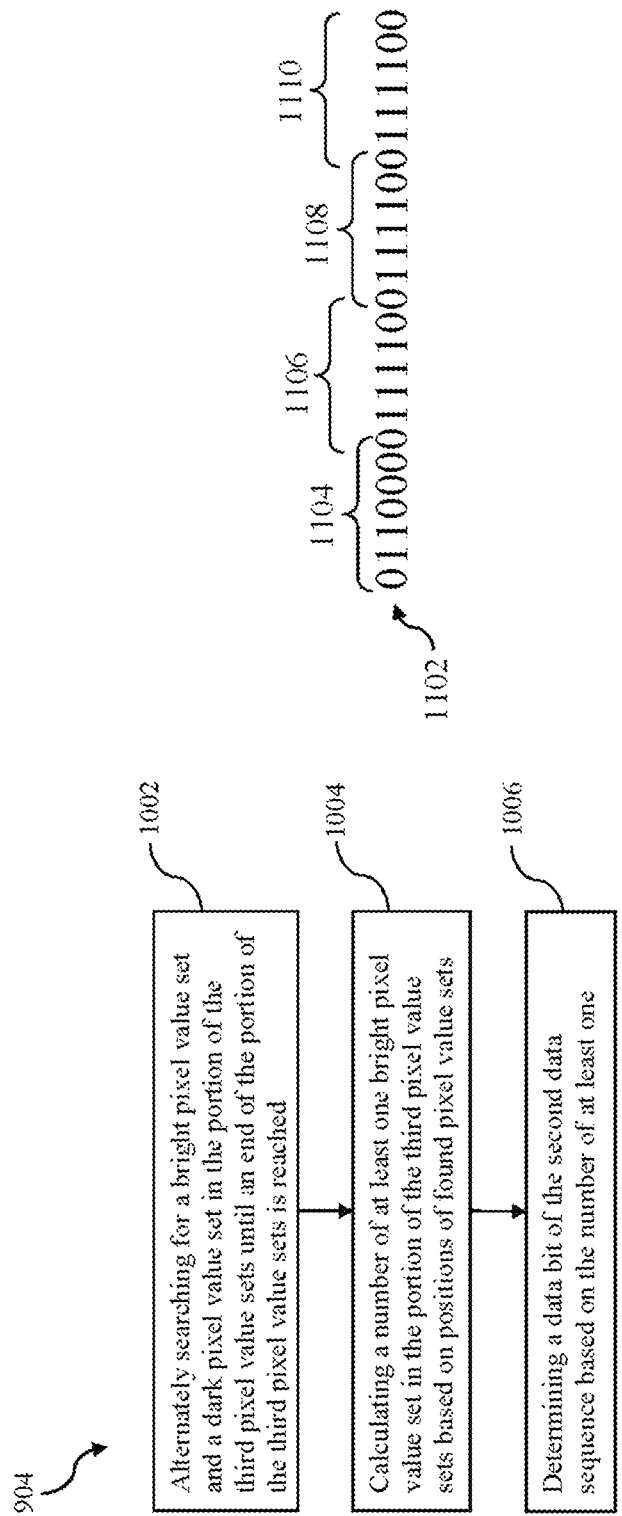

US 11,570,355 B2

METHOD, SYSTEM, AND COMPUTER-READABLE MEDIUM FOR IMAGE SENSOR COMMUNICATION USING DIFFERENT SENDING DATA SEQUENCE RATE AND RECEIVING FRAME RATE

CROSS-REFERENCE TO RELATED APPLICATION(S)

This application is a continuation application of International Application No. PCT/CN2018/117445, filed on Nov. 26, 2018, the entire contents of which are incorporated herein by reference.

TECHNICAL FIELD

The present disclosure relates to the field of image sensor communication, and more particularly, to a method, system, and computer-readable medium for image sensor communication using a sending data sequence rate and a receiving frame rate, which are different.

BACKGROUND

For image sensor communication (ISC), a sending end includes a light source that sends light pulses into which a data sequence is encoded, and a receiving end includes a camera that captures frames correspondingly reflecting sampled light pulses, and at least one processor that processes the frames, to obtain the data sequence. ISC may be used for, for example, in-door navigation and digital signage.

SUMMARY

An object of the present disclosure is to propose a method, system, and computer-readable medium for image sensor communication using a sending data sequence rate and a receiving frame rate, which are different.

In a first aspect of the present disclosure, a computer-implemented method includes: causing a camera module to capture a plurality of frame portions with an exposure time at a sampling clock period. The frame portions correspondingly reflect a predetermined number of first signal pulses periodically generated by a light source. The exposure time corresponds to a duration of one of the predetermined number of first signal pulses. A first data sequence is encoded into the first signal pulses. The sampling clock period is different from a duration of the first data sequence such that a second data sequence is obtained from cycling through all of the first data sequence.

In a second aspect of the present disclosure, a system includes: a camera module, at least one memory, and at least one processor. The at least one memory is configured to store program instructions. The at least one processor is configured to execute the program instructions, which cause the at least one processor to perform steps including: causing a camera module to capture a plurality of frame portions with an exposure time at a sampling clock period. The frame portions correspondingly reflect a predetermined number of first signal pulses periodically generated by a light source. The exposure time corresponds to a duration of one of the predetermined number of first signal pulses. A first data sequence is encoded into the first signal pulses. The sampling clock period is different from a duration of the first data sequence such that a second data sequence is obtained from cycling through all of the first data sequence.

In a third aspect of the present disclosure, a non-transitory computer-readable medium with program instructions stored thereon is provided. When the program instructions are executed by at least one processor, the at least one processor is caused to perform steps including: causing a camera module to capture a plurality of frame portions with an exposure time at a sampling clock period. The frame portions correspondingly reflect a predetermined number of first signal pulses periodically generated by a light source. The exposure time corresponds to a duration of one of the predetermined number of first signal pulses. A first data sequence is encoded into the first signal pulses. The sampling clock period is different from a duration of the first data sequence such that a second data sequence is obtained from cycling through all of the first data sequence.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 10 is a flowchart illustrating a decoding step for a data bit in the decoding step in accordance with an embodiment of the present disclosure.

FIG. 11 is a diagram illustrating a portion of pixel value sets being decoded in accordance with an embodiment of the present disclosure.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

As used here, the term "using" refers to a case in which an object is directly employed for performing a step, or a case in which the object is modified by at least one intervening step and the modified object is directly employed to perform the step.

Figure 1:
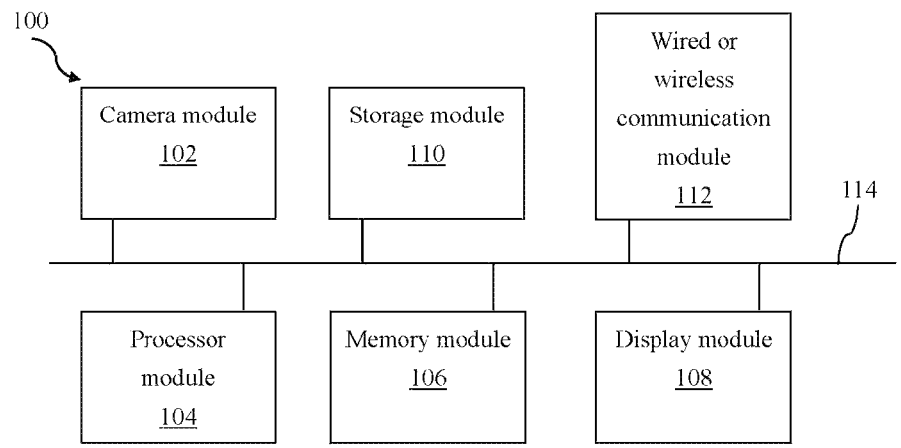
FIG. 1 is a block diagram illustrating inputting, controlling and processing, and outputting hardware modules in a receiving terminal in accordance with an embodiment of the present disclosure.

FIG. 1 is a block diagram illustrating inputting, controlling and processing, and outputting hardware modules in a receiving terminal 100 in accordance with an embodiment of the present disclosure. Referring to FIG. 1, the receiving terminal 100 includes a camera module 102, a processor module 104, a memory module 106, a display module 108, a storage module 110, a wired or wireless communication module 112, and buses 114. The receiving terminal 100 may be, for example, a cell phone, a smartphone, a tablet, a notebook computer, or a desktop computer.

The camera module 102 is an inputting hardware module and is configured to perform a sampling method to be described with reference to FIG. 4 or FIG. 5, to capture a plurality of frame portions each of which is to be transmitted to the processor module 104 through the buses 114. The camera module 102 includes an image sensor which has a two-dimensional photodiode (PD) array structure. The image sensor may be a charge-coupled device (CCD) image sensor or a complementary metal-oxide semiconductor (CMOS) image sensor. In an embodiment to be described with reference to FIG. 4, the camera module 102 is a color camera. Alternatively, the camera module 102 is a grayscale camera. Still alternatively, the camera module 102 is an infrared camera. In an embodiment to described with reference to FIG. 5, the camera module 102 is a color camera.

The memory module 106 may be a transitory or non-transitory computer-readable medium that includes at least one memory storing program instructions that, when executed by the processor module 104, cause the processor module 104 to control the camera module 102 to perform the signal pulse sampling method to be described with reference to FIG. 4 or FIG. 5, process the frame portions using an image processing method to be described with reference to FIGS. 6 to 11, and post-process a result of processing the frame portions for different applications such as in-door navigation and digital signage. The processor module 104 includes at least one processor that sends signals directly or indirectly to and/or receives signals directly or indirectly from the camera module 102, the memory module 106, the display module 108, the storage module 110, and the wired or wireless communication module 112 via the buses 114. The at least one processor may be central processing unit(s) (CPU(s)), graphics processing unit(s) (GPU(s)), and/or digital signal processor(s) (DSP(s)). The CPU(s) may send the frame portions, some of the program instructions and other data or instructions to the GPU(s), and/or DSP(s) via the buses 114.

The display module 108 is an outputting hardware module and is configured to display a post-processing result that is received from the processor module 104 through the buses 114. Alternatively, the post-processing result may be output using another outputting hardware module, such as the storage module 110, or the wired or wireless communication module 112. The storage module 110 is configured to store the post-processing result that is received from the processor module 104 through the buses 114. The wired or wireless communication module 112 is configured to transmit the post-processing result to the network through wired or wireless communication, wherein the post-processing result is received from the processor module 104 through the buses 114.

The receiving terminal 100 is one type of computing system all of components of which are integrated together by the buses 114. Other types of computing systems such as a computing system that has a remote camera module instead of the camera module 102 are within the contemplated scope of the present disclosure.

Figure 2:
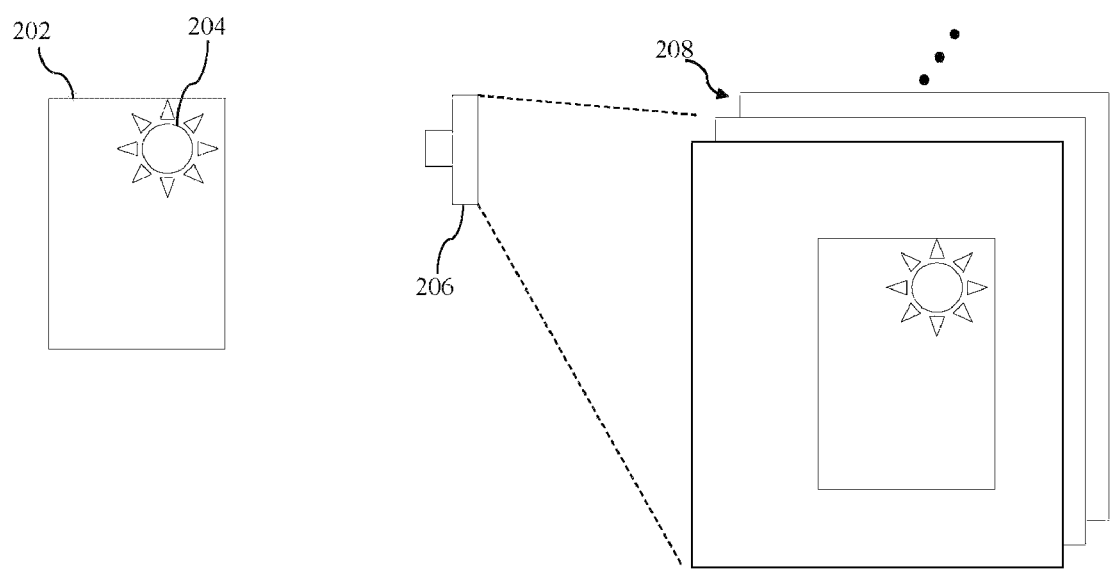
FIG. 2 is a diagram illustrating a light source, and a camera that uses a global shutter sampling method in accordance with an embodiment of the present disclosure.

FIG. 2 is a diagram illustrating a light source 204, and a camera 206 that uses a global shutter sampling method in accordance with an embodiment of the present disclosure. For a sending end of image sensor communication (ISC), a sending source equipped terminal 202 includes a sending device (not shown) including a light source 204 and a pulse driver (not shown) configured to control the light source 204 to send a plurality of light pulses using a signal pulse sending method to be described with reference to FIG. 4 or FIG. 5. The term "light pulse" is also referred to as "signal pulse" throughout the present disclosure. The sending source equipped terminal 202 may be, for example, a cell phone, a smartphone, a tablet, a notebook computer, a desktop computer, or a display apparatus. The light source 204 may emit visible light or invisible light such as infrared. The light source 204 includes at least one light emitting diode (LED), at least one fluorescent lamp, or at least one vertical cavity surface emitting laser (VCSEL). For a receiving end of ISC, a receiving terminal (not shown) includes a camera 206 configured to capture a plurality of frame portions 208 in which a corresponding plurality of sampled light pulses are reflected. The receiving terminal and the camera 206 may correspondingly be the receiving terminal 100 and the camera module 102 described with reference to FIG. 1. The sampled light pulses are sampled using a signal pulse sampling method to be described with reference to FIG. 4 or FIG. 5. In an embodiment, the camera 206 uses the global shutter sampling method such that each of the frame portions 208 include pixels produced by all of the two-dimensional PD array structure of the image sensor of the camera 206.

Figure 3:
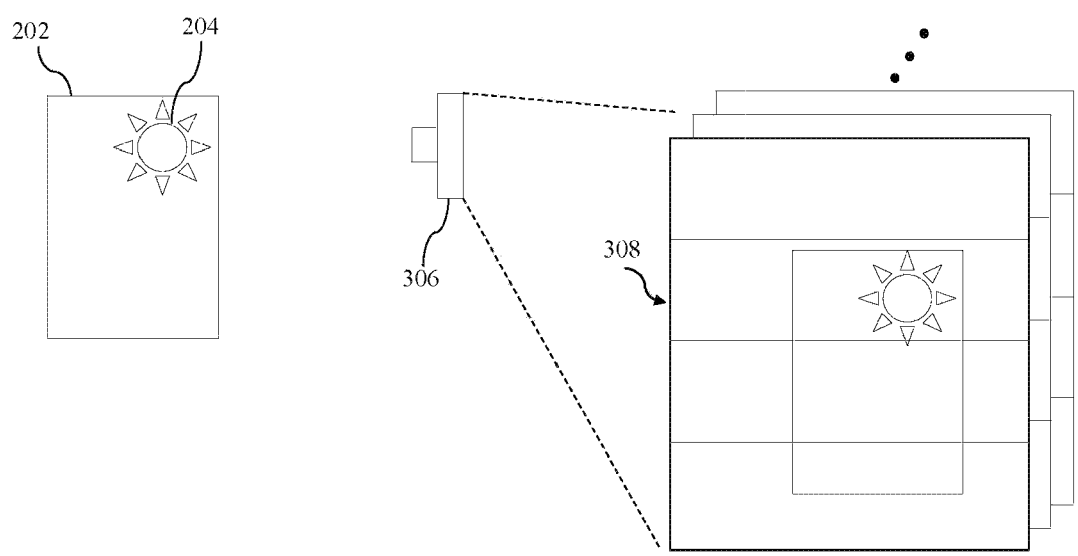
FIG. 3 is a diagram illustrating a light source, and a camera that uses a rolling shutter sampling method in accordance with an embodiment of the present disclosure.

FIG. 3 is a diagram illustrating the light source 204, and a camera 306 that uses a rolling shutter sampling method in accordance with an embodiment of the present disclosure. Compared to the receiving end of ISC described with reference to FIG. 2, a receiving end of ISC in the present embodiment uses a camera 306 rather than the camera 206. The camera 306 uses the rolling shutter sampling method such that each of frame portions 308 include pixels produced by a portion (e.g. a row) of the two-dimensional PD array structure of the image sensor of the camera 306. The following description for signal pulse sampling method embodiments and image processing method embodiments can be applied mutatis mutandis to the receiving end of ISC in the present embodiment.

Figure 4:
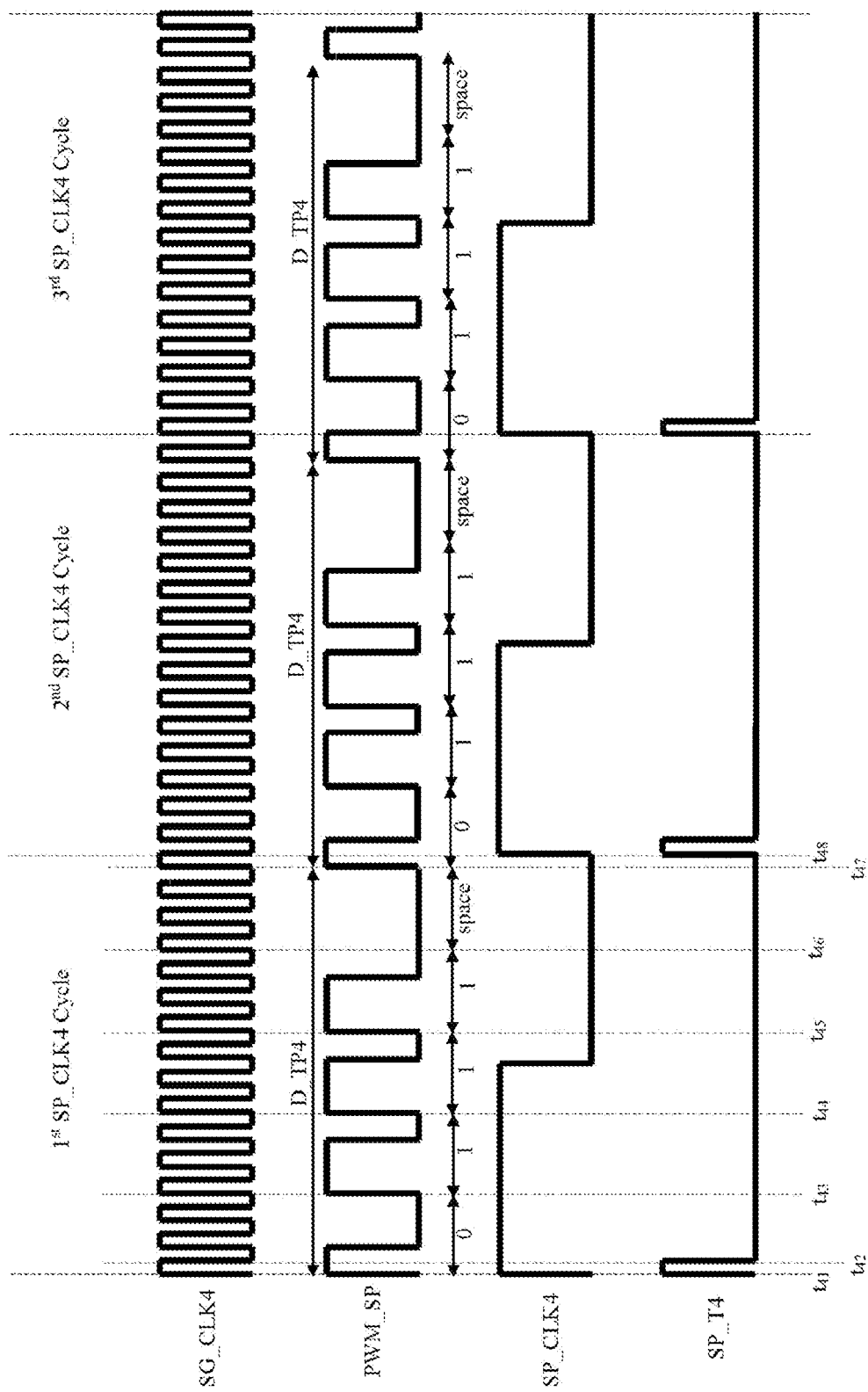
FIG. 4 is a timing diagram illustrating a signal pulse sending method that uses a sending data sequence rate and a signal pulse sampling method that uses a receiving frame rate different from the sending data sequence rate in accordance with an embodiment of the present disclosure.

FIG. 4 is a timing diagram illustrating the signal pulse sending method that uses a sending data sequence rate and the signal pulse sampling method that uses a receiving frame rate different from the sending data sequence rate in accordance with an embodiment of the present disclosure. For the signal pulse sending method, the light source 204 (shown in FIG. 2) sends a corresponding one of first signal pulses PWM_SP every half cycle of a signal clock SG_CLK4. A first data sequence is encoded into a predetermined number of first signal pulses (in the first signal pulses PWM_SP) periodically generated by the light source 204 at the sending data sequence rate. The sending data sequence rate is an inverse of a duration D_TP4 of the first data sequence. The first data sequence is encoded into the first signal pulses by pulse width modulation (PWM). The first set of signal pulses (in the first signal pulses PWM_SP) of the periodically generated sets of first signal pulses is used as an example for describing PWM. The first set of signal pulses is generated between time instances $t_{41}$ and $t_{46}$ of the signal clock SG_CLK4. The first set of signal pulses is divided into 5 sections correspondingly between time instances $t_{41}$ and $t_{43}$, between time instances $t_{43}$ and $t_{44}$, between time instances $t_{44}$ and $t_{45}$, between time instances $t_{45}$ and $t_{46}$, and between time instances $t_{46}$ and $t_{47}$. Each section has 6 signal pulses. For PWM, a corresponding width of, for example, bright pulses, in the 6 signal pulses of each section is used to encode a corresponding data bit or space in the first data sequence. In this example, a bright pulse is shown as a high value in the first signal pulses PWM_SP, and a dark pulse is shown as a low value in the first signal pulses PWM_SP. In an embodiment, when a width of the bright pulses is smaller than or equal to 2, a data bit of 0 is encoded. When a width of the bright pulses is greater than or equal to 3, and smaller than or equal to 4, a data bit of 1 is encoded. When a width of bright pulses is equal to 0, space is encoded. In the example in FIG. 4, for the section between time instances $t_{41}$ and $t_{43}$, a width of the bright pulses is 2, and therefore a data bit of 0 is encoded. For the section between time instances $t_{43}$ and $t_{44}$, and similarly sections correspondingly between time instances $t_{44}$ and $t_{45}$ and between time instances $t_{45}$ and $t_{46}$, a width of the bright pulses is 4, and therefore a data bit of 1 is encoded. For the section between time instances $t_{46}$ and $t_{47}$, a width of the bright pulses is 0, and therefore space is encoded. In the first data sequence, "0111" is a data portion, and "space" is a space portion. Other number of signal pulses in a section, other widths of bright pulses for decoding "1", "0", and space, and a space portion immediately before a data portion are within the contemplated scope of the present disclosure.

For the signal pulse sampling method, the processor module 104 (shown in FIG. 1) is configured to cause the camera 206 (shown in FIG. 2) to capture the frame portions 208 (shown in FIG. 2) with an exposure time at a sampling clock period. In FIG. 4, a sampling clock SP_CLK4 has the sampling clock period. The sampling clock period is different from the duration D_TP4 of the first data sequence such that a second data sequence is obtained from cycling through all of the first data sequence. The receiving frame rate is an inverse of the sampling clock period and is therefore different from the sending data sequence rate. In an embodiment, the sampling clock period exceeds a duration of the first data sequence by a duration of at least one signal pulse. Alternatively, the sampling clock period may be shorter than a duration of the first data sequence by a duration of at least one signal pulse. The duration of at least one signal pulse may be shorter or longer than the duration D_TP4 of the first data sequence. Depending on the sampling clock period, the first data sequence may be cycled through in a non-inverse order or a reverse order. In an embodiment, the second sequence also includes a data portion and a space portion. In an embodiment, the light source 204 has an area that causes flicker for human eyes if a pulse rate of the light source 204 is lower than a threshold. Because the sending data sequence rate and the receiving frame rate are different, the pulse rate may be high enough to cause the first signal pulses PWM_SP to be flicker-suppressed for human eyes while the camera 206 is a low frame rate camera. In an example, the signal clock SG_CLK4 has the frequency of 930 Hz, and the sampling clock SP_CLK4 has a frequency of 60 Hz.

In the example in FIG. 4, the sampling clock period exceeds the duration D_TP4 of the first data sequence by a time period (e.g. between time instances $t_{47}$ and $t_{48}$) having a duration of one signal pulse. The exposure time is equal to a duration of one signal pulse. In FIG. 4, the sampling timing SP_T4 shows a corresponding time period (e.g. between time instances $t_{41}$ and $t_{42}$) during each cycle of the sampling clock SP_CLK4 that the camera 206 exposes, which has a duration equal to the exposure time. Therefore, in the $1^{st}$ SP_CLK4 cycle, the first signal pulse of the 6 signal pulses for the first bit of the first data sequence is sampled. In the $2^{nd}$ SP_CLK4 cycle, the second signal pulse of the 6 signal pulses for the first bit of the first data sequence is sampled. In the $3^{rd}$ SP_CLK4 cycle, the third signal pulse of the 6 signal pulses for the first bit of the first data sequence is sampled. Subsequent SP_CLK4 cycles are omitted for simplicity. Signal pulse by signal pulse, one bit of the first data sequence is cycled through, and bit by bit, the entire first data sequence is cycled through.

Figure 5:
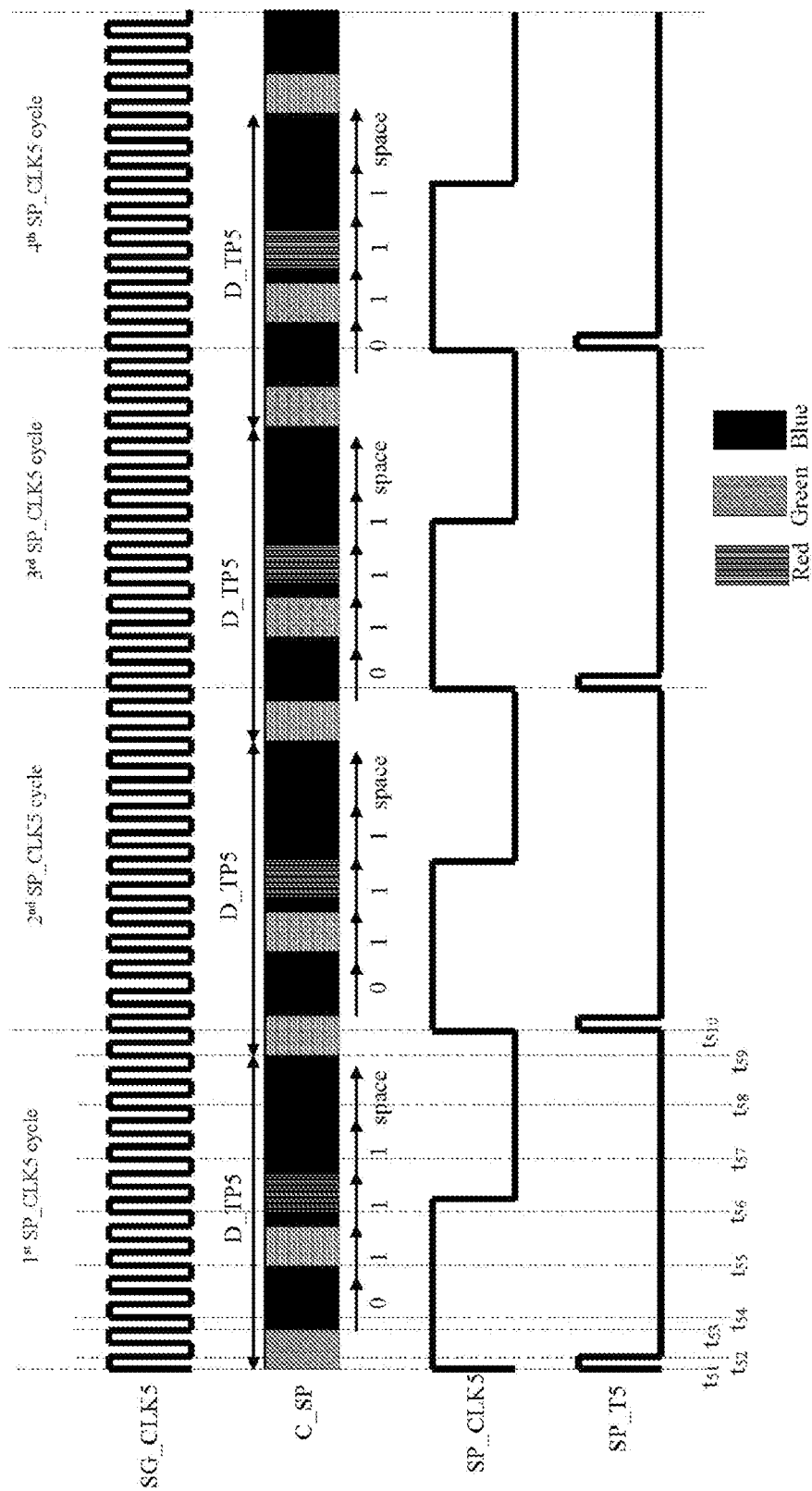
FIG. 5 is a timing diagram illustrating a signal pulse sending method that uses a sending data sequence rate and a signal pulse sampling method that uses a receiving frame rate different from the sending data sequence rate in accordance with another embodiment of the present disclosure.

FIG. 5 is a timing diagram illustrating the signal pulse sending method that uses a sending data sequence rate and the signal pulse sampling method that uses a receiving frame rate different from the sending data sequence rate in accordance with another embodiment of the present disclosure. For the signal pulse sending method, the light source 204 (shown in FIG. 2) sends a corresponding one of first signal pulses C_SP every half cycle of a signal clock SG_CLK5. A first data sequence is encoded into a predetermined number of first signal pulses (in the first signal pulses C_SP) periodically generated by the light source 204 at the sending data sequence rate. The sending data sequence rate is an inverse of a duration D_TP5 of the first data sequence. The first data sequence is encoded into the first signal pulses by differential phase shift keying (DPSK). The first set of signal pulses (in the first signal pulses C_SP) of the periodically generated sets of first signal pulses is used as an example for describing DPSK. The first set of signal pulses is generated between time instances $t_{51}$ and $t_{59}$ of the signal clock SG_CLK5. The first set of signal pulses is divided into 6 sections correspondingly between time instances $t_{51}$ and $t_{54}$, between time instances $t_{54}$ and $t_{55}$, between time instances $t_{55}$ and $t_{56}$, between time instances $t_{56}$ and $t_{57}$, between time instances $t_{57}$ and $t_{58}$, and between time instances $t_{58}$ and $t_{59}$. Each section has 4 signal pulses. The first three (e.g between time instances $t_{51}$ and $t_{53}$) of the 4 signal pulses has one of three colors, and the last (e.g. between time instances $t_{53}$ and $t_{54}$) of the 4 signal pulses is black. In the example in FIG. 5, the three colors are red, green and blue. For DPSK, a color difference between a corresponding first color of the first of each adjacent two sections and a corresponding second color of the second of each adjacent two sections is used to encode a data bit or space. In an embodiment, when a color difference is a change from green to blue, a data bit of 0 is encoded. When a color difference is a change from blue to red, a data bit of 0 is encoded. When a color difference is a change from red to green, a data bit of 0 is encoded. When a color difference is a change from green to red, a data bit of 1 is encoded. When a color difference is a change from red to blue, a data bit of 1 is encoded. When a color difference is a change from blue to green, a data bit of 1 is encoded. When a color difference is no change of color such as from green to green, from red to red, and from blue to blue, space is encoded. Black timing is included in each section to avoid a phase error. In the example in FIG. 5, a color difference between the section between time instances $t_{51}$ and $t_{54}$ and the section between time instances $t_{54}$ and $t_{55}$ is a change from green to blue, and therefore a data bit of 0 is encoded.

A color difference between the section between time instances $t_{54}$ and $t_{55}$ and the section between time instances $t_{55}$ and $t_{56}$ is a change from blue to green, and therefore a data bit of 1 is encoded. A color difference between the section between time instances $t_{55}$ and $t_{56}$ and the section between time instances $t_{56}$ and $t_{57}$ is a change from green to red, and therefore a data bit of 1 is encoded. A color difference between the section between time instances $t_{56}$ and $t_{57}$ and the section between time instances $t_{57}$ and $t_{58}$ is a change from red to blue, and therefore a data bit of 1 is encoded. A color difference between the section between time instances $t_{57}$ and $t_{58}$ and the section between time instances $t_{58}$ and $t_{59}$ is no change (i.e. from blue to blue), and therefore space is encoded. In the first data sequence, "0111" is a data portion, and "space" is a space portion. Other number of signal pulses in a section, and other color differences for decoding "1", "0", and space, and a space portion immediately before a data portion are within the contemplated scope of the present disclosure.

For the signal pulse sampling method, the processor module 104 (shown in FIG. 1) is configured to cause the camera 206 (shown in FIG. 2) to capture the frame portions 208 (shown in FIG. 2) with an exposure time at a sampling clock period. In FIG. 5, a sampling clock SP_CLK5 has the sampling clock period. The sampling clock period is different from the duration D_TP5 of the first data sequence such that a second data sequence is obtained from cycling through all of the first data sequence. The receiving frame rate is an inverse of the sampling clock period and is therefore different from the sending data sequence rate. In an embodiment, the sampling clock period exceeds a duration of the first data sequence by a duration of at least one signal pulse. Alternatively, the sampling clock period may be shorter than a duration of the first data sequence by a duration of at least one signal pulse. The duration of at least one signal pulse may be shorter or longer than the duration D_TP5 of the first data sequence. Depending on the sampling clock period, the first data sequence may be cycled through in a non-inverse order or a reverse order. In an embodiment, the second sequence also includes a data portion and a space portion. In an embodiment, the light source 204 has an area that causes flicker for human eyes if a pulse rate of the light source 204 is lower than a threshold. Because the sending data sequence rate and the receiving frame rate are different, the pulse rate may be high enough to cause the first signal pulses C_SP to be flicker-suppressed for human eyes while the camera 206 is a low frame rate camera. In an example, the signal clock SG_CLK5 has the frequency of 720 Hz, and the sampling clock SP_CLK5 has a frequency of 60 Hz.

In the example in FIG. 5, the sampling clock period exceeds the duration D_TP5 of the first data sequence by a time period (e.g. between time instances $t_{59}$ and $t_{510}$) having a duration of two signal pulses. The exposure time is equal to a duration of one signal pulse. In FIG. 5, the sampling timing SP_T5 shows a corresponding time period (e.g. between time instances $t_{51}$ and $t_{52}$) during each cycle of the sampling clock SP_CLK5 that the camera 206 exposes, which has a duration equal to the exposure time. Therefore, in the 1$^{st}$ SP_CLK5 cycle, the first signal pulse of the 4 signal pulses for the first color for the first bit of the first data sequence is sampled. In the 2$^{nd}$ SP_CLK5 cycle, the third signal pulse of the 4 signal pulses for the first color for the first bit of the first data sequence is sampled. In the 3$^{rd}$ SP_CLK5 cycle, the first signal pulse of the 4 signal pulses for the second color for the first bit of the first data sequence is sampled. In the 4$^{th}$ SP_CLK5 cycle, the third signal pulse of the 4 signal pulses for the second color for the first bit of the first data sequence is sampled. Subsequent SP_CLK5 cycles are omitted for simplicity. Two signal pulses by two signal pulses, one color is cycled through, and color by color, the entire first data sequence is cycled through.

Figure 6:
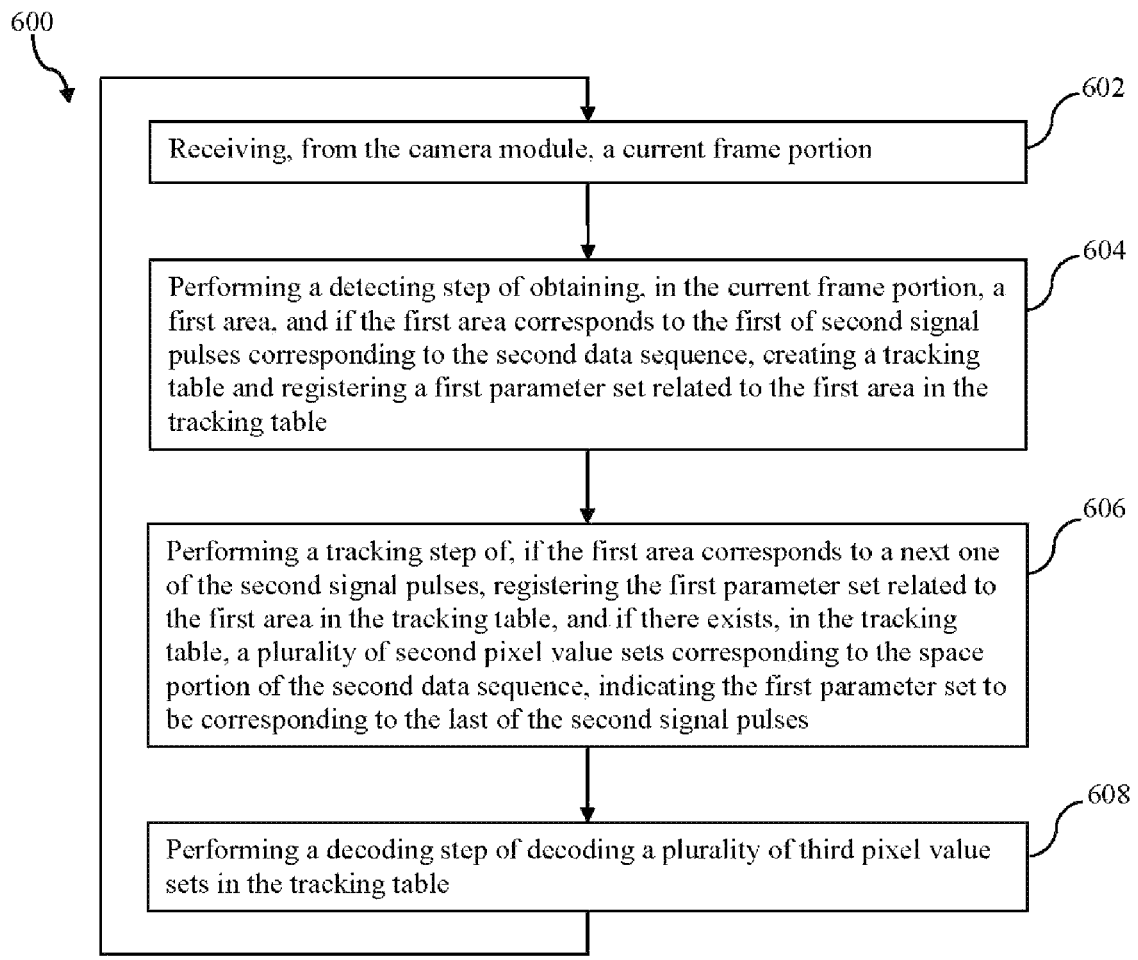
FIG. 6 is a flowchart illustrating an image processing method in accordance with an embodiment of the present disclosure.

FIG. 6 is a flowchart illustrating the image processing method 600 in accordance with an embodiment of the present disclosure. In an embodiment, the image processing method 600 is performed by the processor module 104 in FIG. 1. In the following, the embodiments described with reference to FIG. 4 are used as an example to illustrate the image processing method 600. The image processing method 600 can be applied mutatis mutandis to the embodiments described with reference to FIG. 5. In step 602, a current frame portion of the frame portions 208 is received from the camera module 102. In step 604, a detecting step is performed. The detecting step includes: obtaining, in the current frame portion, a first area, and if the first area corresponds to the first of second signal pulses corresponding to the second data sequence, creating a tracking table and registering a first parameter set related to the first area in the tracking table. In step 606, a tracking step is performed. The tracking step includes: if the first area corresponds to a next one of the second signal pulses, registering the first parameter set related to the first area in the tracking table, and if there exists, in the tracking table, a plurality of second pixel value sets corresponding to the space portion of the second data sequence, indicating the first parameter set to be corresponding to the last of the second signal pulses. The first parameter set includes a first pixel value set of the first area. In an embodiment, the first pixel value set is a hue pixel value. Alternatively, the first pixel value set is RGB pixel values. In step 608, a decoding step is performed. The decoding step includes: decoding a plurality of third pixel value sets in the tracking table. The third pixel value sets are all of pixel value sets in the tracking table. For a next frame portion of the frame portions 208, after the step 608, the image processing method 600 loops back to the step 602.

In the embodiments described with reference to FIG. 6, the image processing method 600 is synchronous with the receiving frame rate and has a processing loop across steps 602-608. Other image processing methods such as an image processing method asynchronous with the receiving frame rate and having a corresponding processing loop in each of steps corresponding to the steps 602-608 in the image processing method 600 are within the contemplated scope of the present disclosure.

Figure 7:
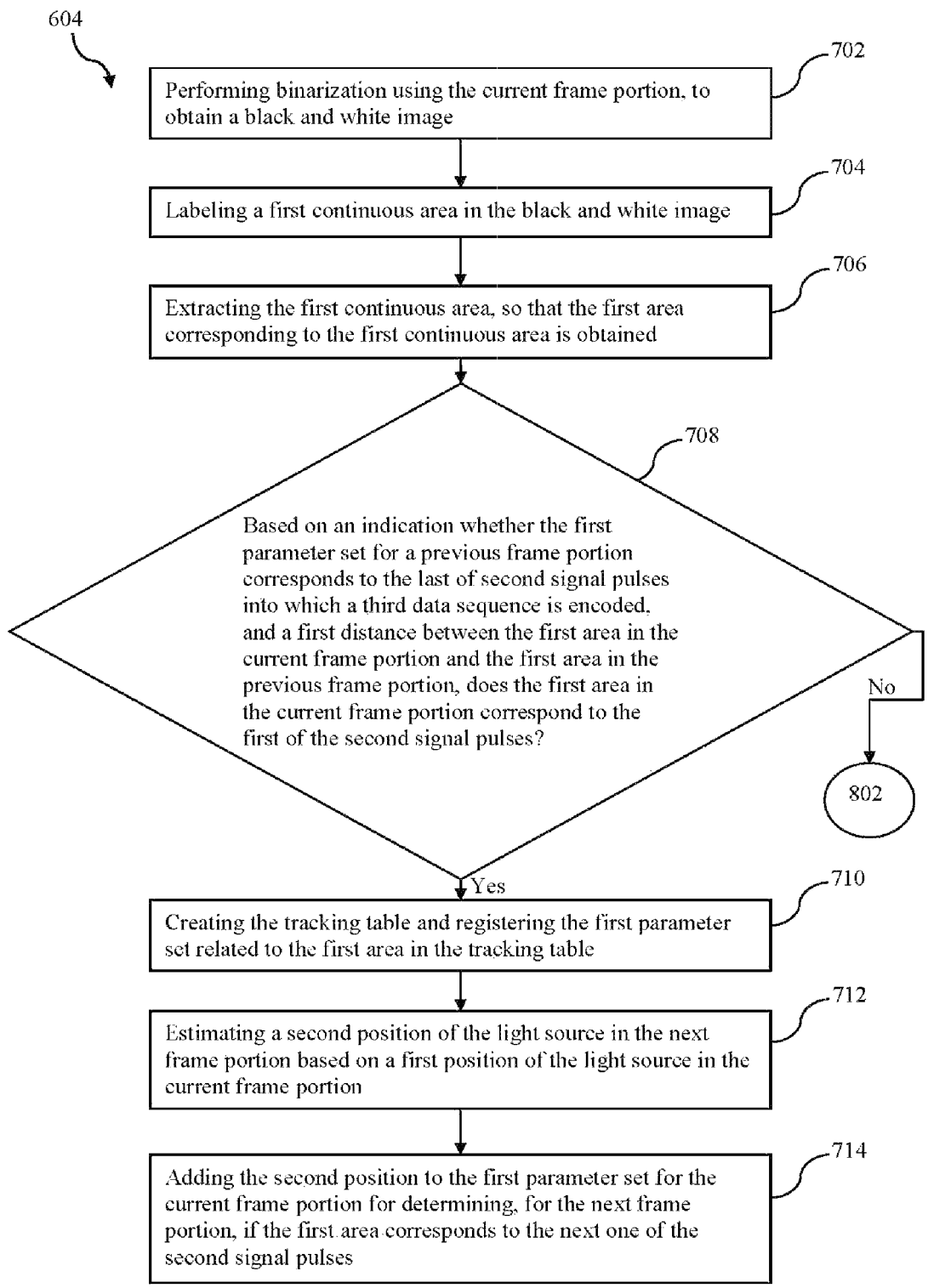
FIG. 7 is a flowchart illustrating a detecting step in the image processing method in accordance with an embodiment of the present disclosure.

FIG. 7 is a flowchart illustrating the step 604 in the image processing method 600 in accordance with an embodiment of the present disclosure. In step 702, binarization using the current frame portion is performed, to obtain a black and white image. In step 704, a first continuous area in the black and white image is labeled. In step 706, the first continuous area is extracted, so that the first area corresponding to the first continuous area is obtained. In step 708, if the first area in the current frame portion corresponds to the first of the second signal pulses based on an indication whether the first parameter set for a previous frame portion of the frame portions 208 corresponds to the last of second signal pulses into which a third data sequence is encoded, and a first distance between the first area in the current frame portion and the first area in the previous frame portion, step 710 is performed; otherwise, the step 604 goes to step 802 to be described with reference to FIG. 8. In an embodiment, the indication is obtained from performing the step 606 in FIG. 6 for the previous frame portion. If the indication is true, and if the first distance is larger than a first threshold to described with reference to FIG. 8, the third data sequence may be different from the second data sequence, and therefore, the first area in the current frame portion is determined to be corresponding to the first of the second signal pulses. In an embodiment, determining if the first area in the current frame portion corresponds to the first of the second signal pulses is further based on a size of the first area, and/or a color type of the first area. In an embodiment, there are two types of color types, one being a black and white color type, and the other being a red, green, and blue color type. In step 710, the tracking table is created and the first parameter set related to the first area in the tracking table is registered. In step 712, a second position of the light source in the next frame portion is estimated based on a first position of the light source in the current frame portion. The first parameter set for the current frame portion further includes the first position of the light source in the current frame portion. In an embodiment, a distance between the first position and an upper bound or a lower bound of estimated values of the second position is a second threshold. In step 714, the second position is added to the first parameter set for the current frame portion for determining, for the next frame portion, if the first area corresponds to the next one of the second signal pulses. Examples of binarization, labeling, extracting, and parameters of the first parameter set are described in more detail in U.S. patent application publication No. 2015/0023673 A1.

Figure 8:
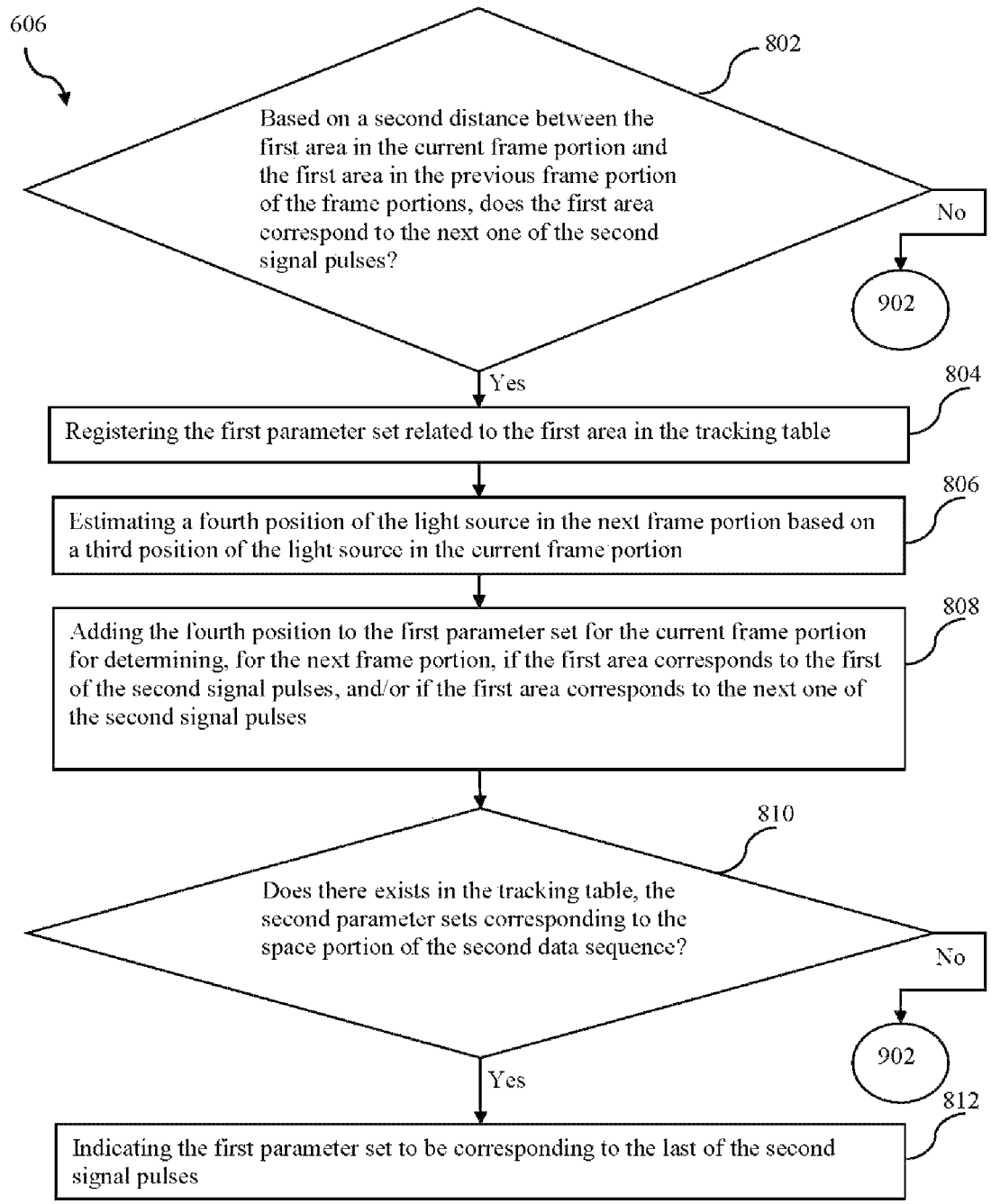
FIG. 8 is a flowchart illustrating a tracking step in the image processing method in accordance with an embodiment of the present disclosure.

FIG. 8 is a flowchart illustrating the step 606 in the image processing method 600 in accordance with an embodiment of the present disclosure. In the step 802, if the first area corresponds to the next one of the second signal pulses based on a second distance between the first area in the current frame portion and the first area in the previous frame portion of the frame portions, step 804 is performed; otherwise, the step 606 goes to step 902 to be described with reference to FIG. 9. In an embodiment, if the second distance is larger than the second threshold when the previous frame portion corresponds to the first of the second signal pulses, or the first threshold when the previous frame portion corresponds to one of a portion of the second signal pulses except for the first and the last of the second signal pulses. In an embodiment, determining if the first area corresponds to the next one of the second signal pulses is further based on a size of the first area, and/or a color type of the first area. In step 804, the first parameter set related to the first area is registered in the tracking table. In step 806, a fourth position of the light source in the next frame portion is estimated based on a third position of the light source in the current frame portion. The first parameter set for the current frame portion further includes the third position of the light source in the current frame portion. In an embodiment, a distance between the third position and an upper bound or a lower bound of estimated values of the fourth position is the first threshold. In step 808, the fourth position is added to the first parameter set for the current frame portion for determining, for the next frame portion, if the first area in the current frame portion corresponds to the first of the second signal pulses, and/or if the first area corresponds to the next one of the second signal pulses. In step 810, if there exists in the tracking table, the second pixel value sets corresponding to the space portion of the second data sequence, step 812 is performed; otherwise, the step 606 goes to the step 902. In an embodiment, the second pixel value sets include the first pixel value set and at least one fourth pixel value set immediately before the first pixel value set. In the example of FIG. 4, a number of pixel value sets for the second pixel value sets is six or more. In step 812, the first parameter set is indicated to be corresponding to the last of the second signal pulses.

Figure 9:
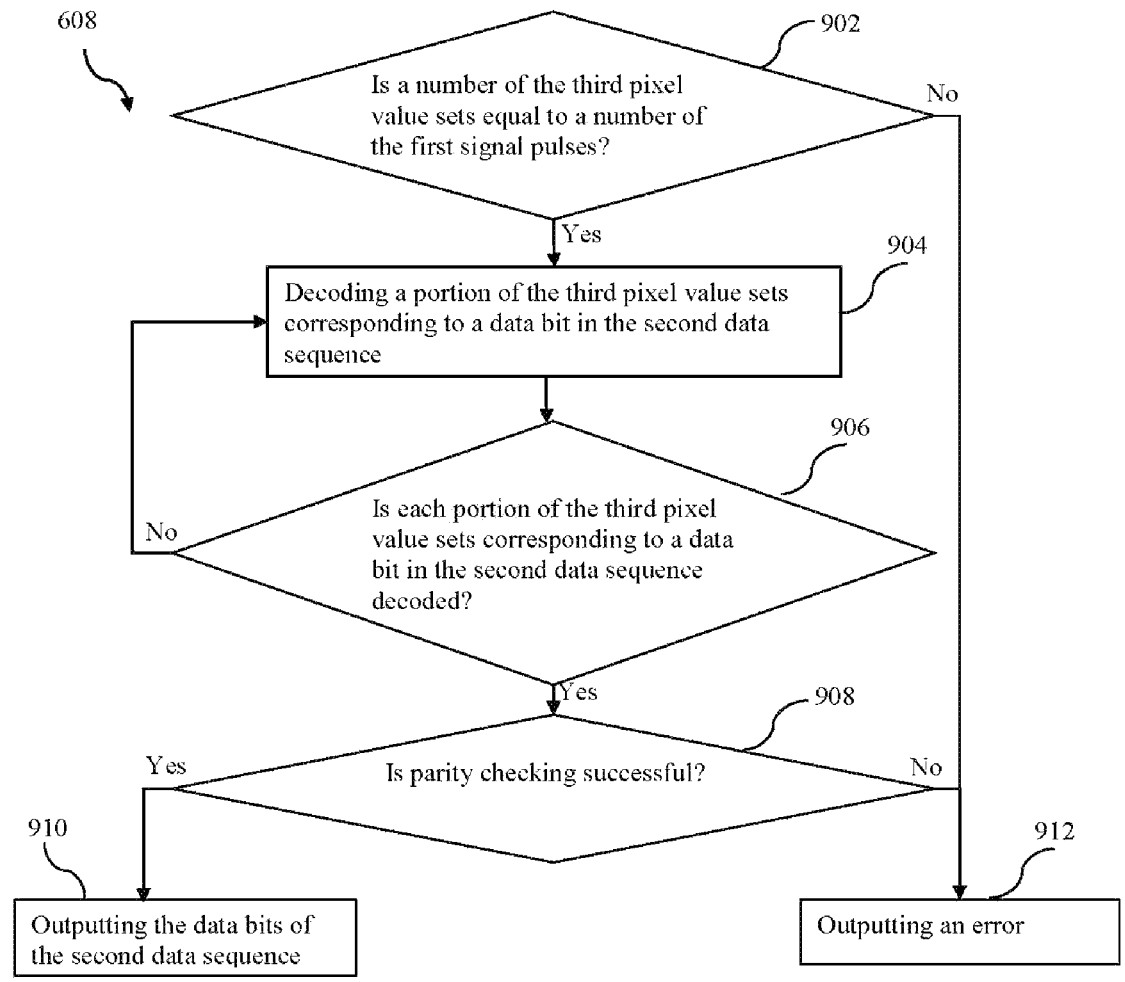
FIG. 9 is a flowchart illustrating a decoding step in the image processing method in accordance with an embodiment of the present disclosure.

FIG. 9 is a flowchart illustrating step 608 in the image processing method 600 in accordance with an embodiment of the present disclosure. In the step 902, if a number of the third pixel value sets is equal to a number of the first signal pulses, step 904 is performed; otherwise, step 912 is performed. In step 904, a portion of the third pixel value sets corresponding to a data bit in the second data sequence is decoded. In step 912, an error is outputted. In step 906, if each portion of the third pixel value sets corresponding to a data bit in the second data sequence is decoded, step 908 is performed; otherwise, the step 608 loops back to the step 904. In step 908, if parity checking is successful, step 910 is performed; otherwise, step 912 is performed. In step 910, the data bits of the second data sequence are outputted.

In the embodiments described with reference to FIG. 9, error detection is done using parity. Other error detection methods such as a more complicated cyclic redundancy check (CRC) are within the contemplated scope of the present disclosure.

FIG. 10 is a flowchart illustrating step 904 in step 608 in FIG. 9 in accordance with an embodiment of the present disclosure. In step 1002, a bright pixel value set and a dark pixel value set are alternately searched for in the portion of the third pixel value sets until an end of the portion of the third pixel value sets is reached. In step 1004, a number of at least one bright pixel value set in the portion of the third pixel value sets is calculated based on positions of found pixel value sets in step 1002. Alternatively, a number of at least one dark pixel value set in the portion of the third pixel value sets is calculated based on positions of found pixel value sets in step 1002. In step 1006, a data bit of the second data sequence is determined based on the number of at least one bright pixel value set. In an embodiment, if a number of the at least one bright pixel value $<=2$, the data bit is 0; if $3<=$the number of the at least one bright pixel value $<=4$, the data bit is 1; and if the number of the at least one bright pixel value $>=5$, the data bit is an error.

FIG. 11 is a diagram illustrating the portion (e.g. 1104) of the third pixel value sets 1102 being decoded in accordance with an embodiment of the present disclosure. The example in FIG. 11 is based on the example in FIG. 4. In the example in FIG. 11, a bright pixel value is represented by "1" and a dark pixel value is represented by "0". There are seven pixel values in the portion (e.g. 1104) of the third pixel value sets 1102. Take the portion 1106 of the third pixel value sets 1102 as an example. The first pixel value of the portion 1106 of the third pixel value sets 1102 is the last pixel value of the portion 1104 of the third pixel value sets 1102. In an embodiment, the last pixel value of each portion of the third pixel value sets 1102 is always the dark pixel value. In the example in FIG. 11, a number of the at least one bright pixel value of the portion 1104 of the third pixel value sets 1102 is 2, and therefore, a corresponding data bit in the second data sequence is 0. A number of the at least one bright pixel value of the portion 1106 of the third pixel value sets 1102 is 4, and therefore, a corresponding data bit in the second data sequence is 1. A number of the at least one bright pixel value of the portion 1108 of the third pixel value sets 1102 is 4, and therefore, a corresponding data bit in the second data sequence is 1. A number of the at least one bright pixel value of the portion 1110 of the third pixel value sets 1102 is 4, and therefore, a corresponding data bit in the second data sequence, which is also a parity bit, is 1. In the example in FIG. 11, odd parity is used. There are even number of "1"s in the second data sequence except for the parity bit, and the parity bit is 1. Therefore, parity checking is successful. Alternatively, even parity may be used.

Some embodiments have one or a combination of the following features and/or advantages. In an embodiment, a camera module is caused to capture a plurality of frame portions at a sampling clock period. The frame portions correspondingly reflect a predetermined number of sampled signal pulses periodically generated by a light source. A first data sequence is encoded into the signal pulses. The sampling clock period is different from a duration of the first data sequence such that a second data sequence is obtained from cycling through all of the first data sequence. Compared to a related art that uses a camera that samples signal pulses at a frame rate same as a pulse rate of the signal pulses, the camera module of the present embodiment may be a low frame rate camera while the light source may use a high pulse rate that causes the signal pulses to be flicker-suppressed for human eyes.

A person having ordinary skill in the art understands that each of the units, modules, layers, blocks, algorithm, and steps of the system or the computer-implemented method described and disclosed in the embodiments of the present disclosure are realized using hardware, firmware, software, or a combination thereof. Whether the functions run in hardware, firmware, or software depends on the condition of application and design requirement for a technical plan. A person having ordinary skill in the art can use different ways to realize the function for each specific application while such realizations should not go beyond the scope of the present disclosure.

It is understood that the disclosed system, and computer-implemented method in the embodiments of the present disclosure can be realized with other ways. The above-mentioned embodiments are exemplary only. The division of the modules is merely based on logical functions while other divisions exist in realization. The modules may or may not be physical modules. It is possible that a plurality of modules are combined or integrated into one physical module. It is also possible that any of the modules is divided into a plurality of physical modules. It is also possible that some characteristics are omitted or skipped. On the other hand, the displayed or discussed mutual coupling, direct coupling, or communicative coupling operate through some ports, devices, or modules whether indirectly or communicatively by ways of electrical, mechanical, or other kinds of forms.

The modules as separating components for explanation are or are not physically separated. The modules are located in one place or distributed on a plurality of network modules. Some or all of the modules are used according to the purposes of the embodiments.

If the software function module is realized and used and sold as a product, it can be stored in a computer readable storage medium. Based on this understanding, the technical plan proposed by the present disclosure can be essentially or partially realized as the form of a software product. Or, one part of the technical plan beneficial to the conventional technology can be realized as the form of a software product. The software product is stored in a computer readable storage medium, including a plurality of commands for at least one processor of a system to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program instructions.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A computer-implemented method, comprising:
   causing a camera module to capture a plurality of frame portions with an exposure time at a sampling clock period;
   wherein
   the plurality of frame portions correspondingly reflect a predetermined number of first signal pulses periodically generated by a light source;
   the exposure time corresponds to a duration of one of the predetermined number of first signal pulses;
   a first data sequence is encoded into the predetermined number of first signal pulses;
   the sampling clock period exceeds a duration of the first data sequence by a duration of at least one of the predetermined number of first signal pulses such that a second data sequence is obtained from cycling through all of the first data sequence; and
   the duration of the first data sequence is a duration of the predetermined number of first signal pulses.

2. The method of claim 1, wherein
   the first data sequence is encoded into the first signal pulses by pulse width modulation (PWM); and
   one of the first signal pulses is bright or dark.

3. The method of claim 1, wherein
   the first data sequence is encoded into the first signal pulses by differential phase shift keying (DPSK); and
   one of the first signal pulses has one of three colors.

4. The method of claim 3, wherein
   a first portion of the first signal pulses has a first one of the three colors;
   a second portion of the first signal pulses immediately following the first portion of the first signal pulses is black;
   a third portion of the first signal pulses immediately following the second portion of the first signal pulses has a second one of the three colors; and
   the first one of the three colors and the second one of the three colors are same or different.

5. The method of claim 1, wherein the second data sequence comprises a data portion and a space portion immediately before or immediately after the data portion.

6. The method of claim 5, further comprising the following steps in between the camera module capturing a current frame portion and a next frame portion of the frame portions:
   a step A1 of receiving from the camera module the current frame portion;
   a step A2 of obtaining, in the current frame portion, a first area, and if the first area corresponds to the first of second signal pulses corresponding to the second data sequence, creating a tracking table and registering a first parameter set related to the first area in the tracking table, wherein the first parameter set comprises a first pixel value set of the first area;
   a step A3 of, if the first area corresponds to a next one of the second signal pulses, registering the first parameter set related to the first area in the tracking table, and if there exists, in the tracking table, a plurality of second pixel value sets corresponding to the space portion of the second data sequence, indicating the first parameter set to be corresponding to the last of the second signal pulses; and a step A4 of decoding a plurality of third pixel value sets in the tracking table, wherein the third pixel value sets are all of pixel value sets in the tracking table.

7. The method of claim 6, wherein the step A2 comprises:
performing binarization using the current frame portion, to obtain a black and white image;
labeling a first continuous area in the black and white image; and
extracting the first continuous area, so that the first area corresponding to the first continuous area is obtained.

8. The method of claim 6, wherein the step A2 comprises:
determining if the first area in the current frame portion corresponds to the first of the second signal pulses based on an indication whether the first parameter set for a previous frame portion corresponds to the last of second signal pulses into which a third data sequence is encoded, and a first distance between the first area in the current frame portion and the first area in the previous frame portion.

9. The method of claim 8, wherein the step A2 further comprises:
if the first area in the current frame portion corresponds to the first of the second signal pulses,
estimating a second position of the light source in the next frame portion based on a first position of the light source in the current frame portion, wherein the first parameter set for the current frame portion further comprises the first position of the light source in the current frame portion; and
adding the second position to the first parameter set for the current frame portion for determining, for the next frame portion, if the first area corresponds to the next one of the second signal pulses.

10. The method of claim 8, wherein the step A3 comprises:
determining if the first area corresponds to the next one of the second signal pulses based on a second distance between the first area in the current frame portion and the first area in the previous frame portion of the frame portions.

11. The method of claim 10, wherein the step A3 further comprises:
if the first area corresponds to the next one of the second signal pulses,
estimating a fourth position of the light source in the next frame portion based on a third position of the light source in the current frame portion, wherein the first parameter set for the current frame portion further comprises the third position of the light source in the current frame portion; and
adding the fourth position to the first parameter set for the current frame portion for determining, for the next frame portion, if the first area corresponds to the first of the second signal pulses, and/or if the first area corresponds to the next one of the second signal pulses.

12. The method of claim 6, wherein the step A4 comprises:
if a number of the third pixel value sets is not equal to a number of the first signal pulses, outputting an error; and
if a number of the third pixel value sets is equal to a number of first signal pulses, decoding the third pixel value sets.

13. The method of claim 12, wherein the step of decoding the third pixel value sets comprises:
a step B1 of alternately searching for a bright pixel value set and a dark pixel value set in a portion of the third pixel value sets until an end of the portion of the third pixel value sets is reached;
a step B2 of calculating a number of at least one bright or dark pixel value set in the portion of the third pixel value sets based on positions of found pixel value sets in the step B1; and
a step B3 of determining a data bit of the second data sequence based on the number of the at least one bright or dark pixel value set.

14. The method of claim 1, wherein a pulse rate of the first signal pulses causes the first signal pulses to be flicker-suppressed.

15. A system, comprising:
a camera module;
at least one memory configured to store program instructions; and
at least one processor configured to execute the program instructions, which cause the at least one processor to perform steps comprising:
causing a camera module to capture a plurality of frame portions with an exposure time at a sampling clock period;
wherein
the plurality of frame portions correspondingly reflect a predetermined number of first signal pulses periodically generated by a light source;
the exposure time corresponds to a duration of one of the predetermined number of first signal pulses;
a first data sequence is encoded into the predetermined number of first signal pulses;
the sampling clock period exceeds a duration of the first data sequence by a duration of at least one of the predetermined number of first signal pulses such that a second data sequence is obtained from cycling through all of the first data sequence; and
the duration of the first data sequence is a duration of the predetermined number of first signal pulses.

16. The system of claim 15, wherein
the first data sequence is encoded into the first signal pulses by pulse width modulation (PWM); and
one of the first signal pulses is bright or dark.

17. The system of claim 15, wherein the first data sequence is encoded into the first signal pulses by differential phase shift keying (DPSK); and
one of the first signal pulses has one of three colors, wherein
a first portion of the first signal pulses has a first one of the three colors;
a second portion of the first signal pulses immediately following the first portion of the first signal pulses is black;
a third portion of the first signal pulses immediately following the second portion of the first signal pulses has a second one of the three colors; and
the first one of the three colors and the second one of the three colors are same or different.

18. The system of claim 15, wherein the second data sequence comprises a data portion and a space portion immediately before or immediately after the data portion,
wherein the steps further comprising the following steps in between the camera module capturing a current frame portion and a next frame portion of the frame portions:

a step A1 of receiving from the camera module the current frame portion;

a step A2 of obtaining, in the current frame portion, a first area, and if the first area corresponds to the first of second signal pulses corresponding to the second data sequence, creating a tracking table and registering a first parameter set related to the first area in the tracking table, wherein the first parameter set comprises a first pixel value set of the first area;

a step A3 of, if the first area corresponds to a next one of the second signal pulses, registering the first parameter set related to the first area in the tracking table, and if there exists, in the tracking table, a plurality of second pixel value sets corresponding to the space portion of the second data sequence, indicating the first parameter set to be corresponding to the last of the second signal pulses; and a step A4 of decoding a plurality of third pixel value sets in the tracking table, wherein the third pixel value sets are all of pixel value sets in the tracking table.

\* \* \* \* \*